(12) United States Patent
Kawakami

(10) Patent No.: US 7,520,377 B2
(45) Date of Patent: Apr. 21, 2009

(54) BEAN SPROUTS-LIKE ARTICLES TRANSFER CONVEYOR DEVICE

(75) Inventor: Sanji Kawakami, Tsurugashima (JP)

(73) Assignee: Daisey Machinery Co., Ltd., Saitama-Ken (JP)

( * ) Notice: Subject to any disclaimer, the term of this patent is extended or adjusted under 35 U.S.C. 154(b) by 25 days.

(21) Appl. No.: 11/976,145

(22) Filed: Oct. 22, 2007

(65) Prior Publication Data

US 2008/0251357 A1  Oct. 16, 2008

(30) Foreign Application Priority Data

Apr. 16, 2007 (JP) ............................. 2007-107054

(51) Int. Cl.
    *B65G 47/34* (2006.01)
    *B65G 15/42* (2006.01)
(52) U.S. Cl. ...................................... 198/493; 198/693
(58) Field of Classification Search ................. 198/493, 198/495, 692, 693, 699.1
    See application file for complete search history.

(56) References Cited

U.S. PATENT DOCUMENTS

| | | | | |
|---|---|---|---|---|
| 1,465,050 A | * | 8/1923 | Kinsley | ...................... 209/250 |
| 2,775,425 A | * | 12/1956 | Engvall | ...................... 177/120 |
| 2,907,076 A | * | 10/1959 | Bean | ............................. 19/100 |
| 4,421,185 A | * | 12/1983 | Koto et al. | ............... 177/25.18 |
| 4,751,974 A | * | 6/1988 | Kawakami | .................. 177/114 |
| 5,613,594 A | * | 3/1997 | Kootsouradis | .............. 198/495 |
| 5,716,185 A | * | 2/1998 | Campbell et al. | ........... 414/412 |
| 6,544,572 B1 | * | 4/2003 | Nakada | ...................... 426/506 |
| 6,732,854 B2 | * | 5/2004 | Kuchta et al. | ............... 198/495 |
| 7,075,018 B1 | * | 7/2006 | Scholz et al. | ................. 177/16 |
| 2001/0017253 A1 | * | 8/2001 | Patel et al. | .................. 198/493 |

FOREIGN PATENT DOCUMENTS

| | | |
|---|---|---|
| JP | 63-152516 | 6/1988 |
| JP | 63-281901 | 11/1988 |
| JP | 08131145 A * | 5/1996 |

* cited by examiner

*Primary Examiner*—Mark A Deuble
(74) *Attorney, Agent, or Firm*—Wenderoth, Lind & Ponack, L.L.P.

(57) ABSTRACT

A bean sprouts-like articles transfer conveyor is provided in which bean sprouts-like articles are uniformly delivered from a delivery end of a transfer conveyor without loss and in a dispersed state. The transfer conveyor device comprises a transfer conveyor (3) and an air supply means. The transfer conveyor (3) has a permeability and turns at its both ends so as to run endlessly and also has its outer surface provided with needle members (5). The air supply means leads air to an inner side of the transfer conveyor (3) at a delivery end (15) thereof so that the air ejected from an air ejecting port (25) is blown out from the surface of the transfer conveyor (3) provided with the needle members (5) through the transfer conveyor (3) having the permeability. Thereby, bean sprouts on the surface of the transfer conveyor (3) at the delivery end (15), sticking to or being caught on the needle members (5) of the transfer conveyor (3), are separated and removed to be delivered. Thus, such a loss can be avoided that good bean sprouts are transferred to a return running path of the transfer conveyor (3) to be removed and disposed as waste together with unnecessary matters.

6 Claims, 5 Drawing Sheets

BEAN SPROUTS-LIKE ARTICLES TRANSFER CONVEYOR DEVICE

BACKGROUND OF THE INVENTION

1. Field of the Invention

The present invention relates to a bean sprouts-like articles transfer conveyor device comprising a transfer conveyor having its surface provided with a plurality of needle members for transferring various kinds of bean sprouts, cut vegetables, mesclun greens or other slender shape articles (all these articles are hereinafter jointly referred to as "bean sprouts-like articles").

2. Description of the Prior Art

As the bean sprouts-like articles are easily entangled with each other or biased to be lumped together to be thus hardly transferred with a good metering ability in a dispersed state, when they are to be transferred, such a transfer device as comprises a transfer conveyor provided with a plurality of needle members rising from a surface of the transfer conveyor is often used. For example, if the bean sprouts-like articles are to be metered by a predetermined quantity to be packaged, in order to accurately carry out the metering, it is required to uniformly supply the bean sprouts-like articles in the dispersed state into a metering bucket. In order to so uniformly transfer the bean sprouts-like articles, a transfer device comprising a transfer conveyor provided with a plurality of needle members rising from a surface of the transfer conveyor is used (Patent Documents 1 and 2 below).

Nevertheless, in the conventional transfer device comprising the transfer conveyor provided with the plurality of needle members rising from the surface of the transfer conveyor, the bean sprouts-like articles are often entangled or caught on the needle members so that they do not fall down from a delivery end of the transfer conveyor but enter a return running path and are removed from the transfer conveyor by a scraper or the like in the return running path together with unnecessary matters sticking to the transfer conveyor, such as dust, broken fractions, roots, shells, etc. While the bean sprouts-like articles so removed from the transfer conveyor in the return running path are disposed as waste, quantity thereof is by no means small. In the waste removed from the transfer conveyor to be disposed, there are mixed not a small quantity of good bean sprouts-like articles that have been merely entangled or caught on the needle members, as mentioned above. Hence, if the quantity of the good bean sprouts-like articles to be disposed becomes large, profitability of producing the bean sprouts-like articles will be badly affected.

Also, the bean sprouts-like articles that have been entangled on the needle members to become a lump state may sometimes fall down from the transfer conveyor at the delivery end thereof. If the bean sprouts-like articles transferred are delivered not in the dispersed state but in the lump state from the transfer conveyor, there arises a problem that accuracy of a metering apparatus receiving the delivered bean sprouts-like articles for metering a predetermined quantity thereof will be badly affected.

As seen in the Patent Documents 1 and 2, in order to solve the problem that the bean sprouts-like articles are delivered in the lump state from the transfer conveyor, the delivery end of the transfer conveyor provided with the needle members is fitted with a loosening device comprising a vibrating plate or a loosening device that comprises a plurality of needle members and is displaceable so that the bean sprouts-like articles falling down in the lump state gives no bad influence on the metering device. Nevertheless, it is still difficult to reduce the quantity of the bean sprouts-like articles that stick to the needle members to be transferred to the return running path and removed as waste together with the unnecessary matters.

Patent Document 1: Japanese laid-open patent application No. 1988-152516

Patent Document 2: Japanese laid-open patent application No. 1988-281901

SUMMARY OF THE INVENTION

In order to solve the various shortcomings as seen in the conventional bean sprouts-like articles transfer device, it is an object of the present invention to provide a bean sprouts-like articles transfer conveyor device in which bean sprouts-like articles as good commercial products caught on needle members are selectively caused to fall down from a delivery end of a transfer conveyor so that they can be delivered as good bean sprouts-like articles separately from small matters sticking to the transfer conveyor, such as dust, broken fractions, roots, shells, etc. and at the same time, they can be delivered always with a good metering ability in a dispersed state.

In order to achieve the above-mentioned object, the present invention provides a bean sprouts-like articles transfer conveyor device comprising a transfer conveyor and a fluid supply means. This transfer conveyor has a fluid-passability or permeability and is constructed to turn at its both end portions so as to run endlessly and also has its outer side surface provided with a plurality of needle members. The fluid supply means is constructed to lead fluid to an inner side of the transfer conveyor at a position of the delivery end of the transfer conveyor so that the fluid led from the fluid supply means is ejected from the surface of the transfer conveyor provided with the needle members through the transfer conveyor having the fluid-passibility.

As the above-mentioned transfer conveyor used in the bean sprouts-like articles transfer conveyor device according to the present invention, such a conveyor may be used as comprises two chains wound around two sprockets arranged at the respective end portions of the transfer conveyor and a plurality of conveyor plates having the fluid-passability. The conveyor plates are arranged in parallel with each other having their both end portions fitted to the chains and are provided with the needle members.

Also, in the bean sprouts-like articles transfer conveyor device according to the present invention, it is preferable that a scraper member provided with grooves through which the needle members pass is arranged being opposed to the transfer conveyor at a position downstream of the delivery end for scraping out the sticking matters from the transfer conveyor.

In the bean sprouts-like articles transfer conveyor device according to the present invention, the fluid led from the fluid supply means is ejected from the surface of the delivery end of the transfer conveyor having the fluid-passability and being provided with the needle members. Hence, with respect to the bean sprouts-like articles on the surface of the delivery end of the transfer conveyor, not only those sticking to the needle members of the transfer conveyor but also those entangled or caught on the needle members can be separated and removed to be delivered from the transfer conveyor by the ejected fluid. Hence, such a loss can be avoided that the good bean sprouts-like articles pass the delivery end as they stick to or are caught on the transfer conveyor to enter the return running path of the transfer conveyor and to be removed and disposed as waste by a scraper, etc. together with the unnecessary matters. Also, by adjusting flow velocity or flow rate of the fluid to be ejected from the surface of the transfer conveyor, sizes, etc. of the bean sprouts-like articles to be separated at the delivery end of the transfer conveyor provided with the needle members can be selected.

Also, in the bean sprouts-like articles transfer conveyor device according to the present invention, the bean sprouts-like articles separated from the transfer conveyor by the ejected fluid are in the dispersed state and are in no case delivered in the lump state as in the conventional case. Hence, they can be delivered in a good dispersed state from the delivery end. Moreover, by the fluid ejection from the surface of the transfer conveyor having the fluid-passability and being provided with the needle members, water drops or water content sticking to the bean sprouts-like articles on the transfer conveyor are blown off to be removed from the bean sprouts-like articles. Thus, there is obtained an advantage that draining of the water of the bean sprouts-like articles to be delivered from the transfer conveyor can be quickly carried out.

Further, the bean sprouts-like articles transfer conveyor device according to the present invention can be arranged having the above-mentioned delivery end confronted with a metering hopper of a bean sprouts-like articles metering apparatus so that the bean sprouts-like articles are supplied into the metering hopper. By so arranging the bean sprouts-like articles transfer conveyor device according to the present invention, the bean sprouts-like articles can be delivered in the dispersed state into the metering hopper and it becomes possible to provide a metering apparatus by which the bean sprouts-like articles are uniformly supplied into the metering hopper so that a predetermined quantity of the bean sprouts-like articles can be accurately metered.

DESCRIPTION OF THE PREFERRED EMBODIMENTS

Figure 1:
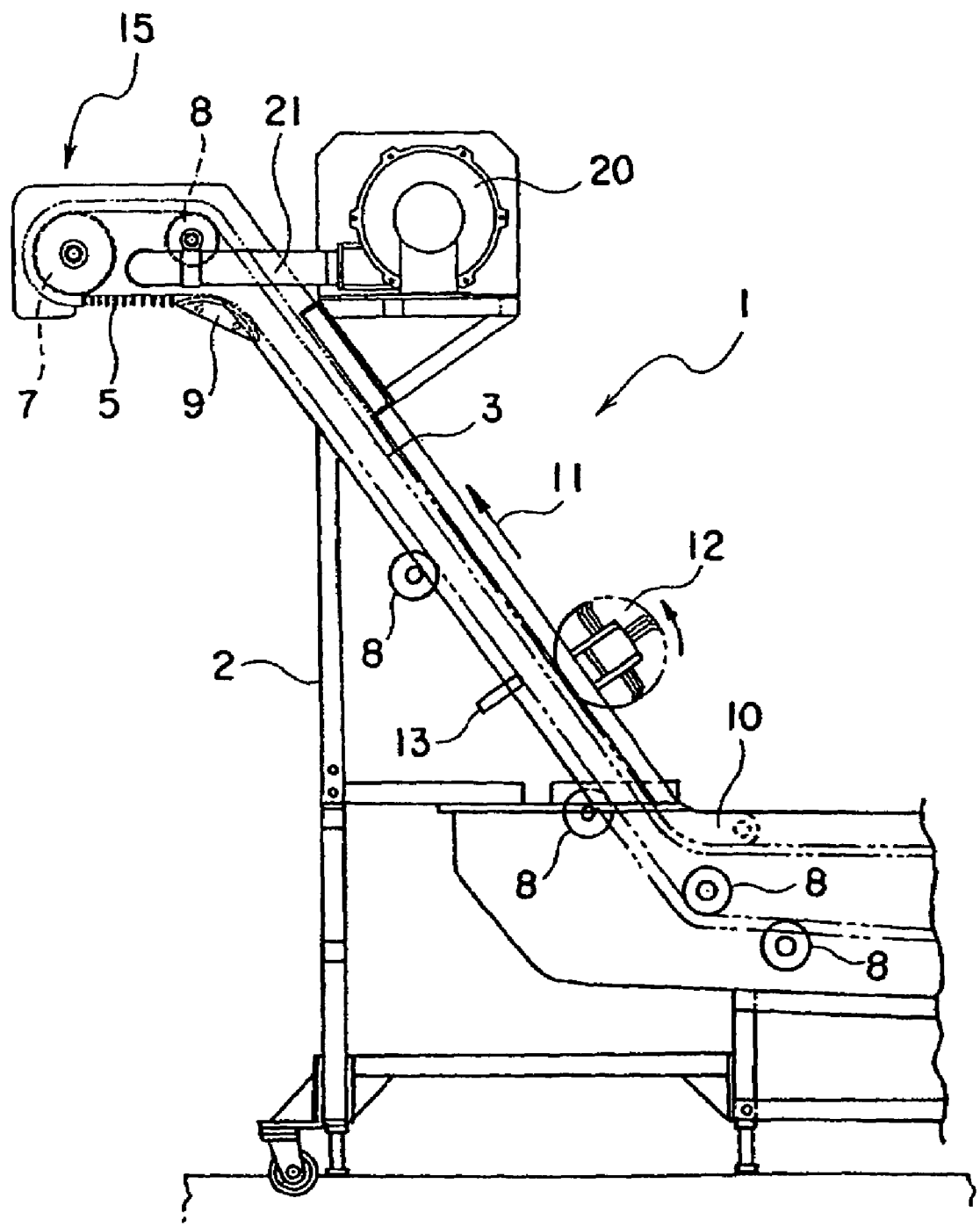
FIG. 1 is a side view showing an entire construction of a bean sprouts transfer conveyor device of an embodiment according to the present invention.
Figure 2:
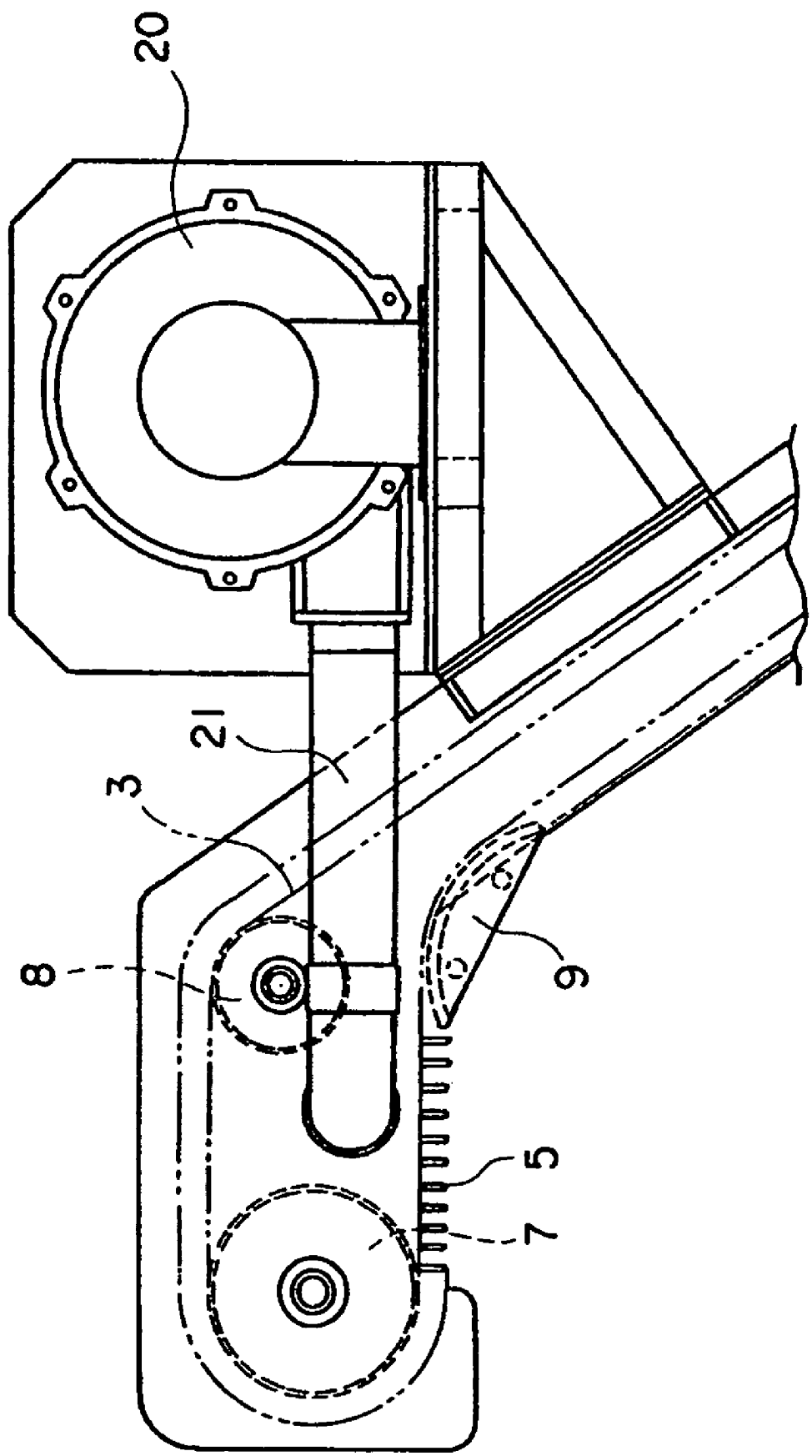
FIG. 2 is an enlarged side view showing a structure of a delivery end portion of a transfer conveyor in the bean sprouts transfer conveyor device of FIG. 1.
Figure 5:
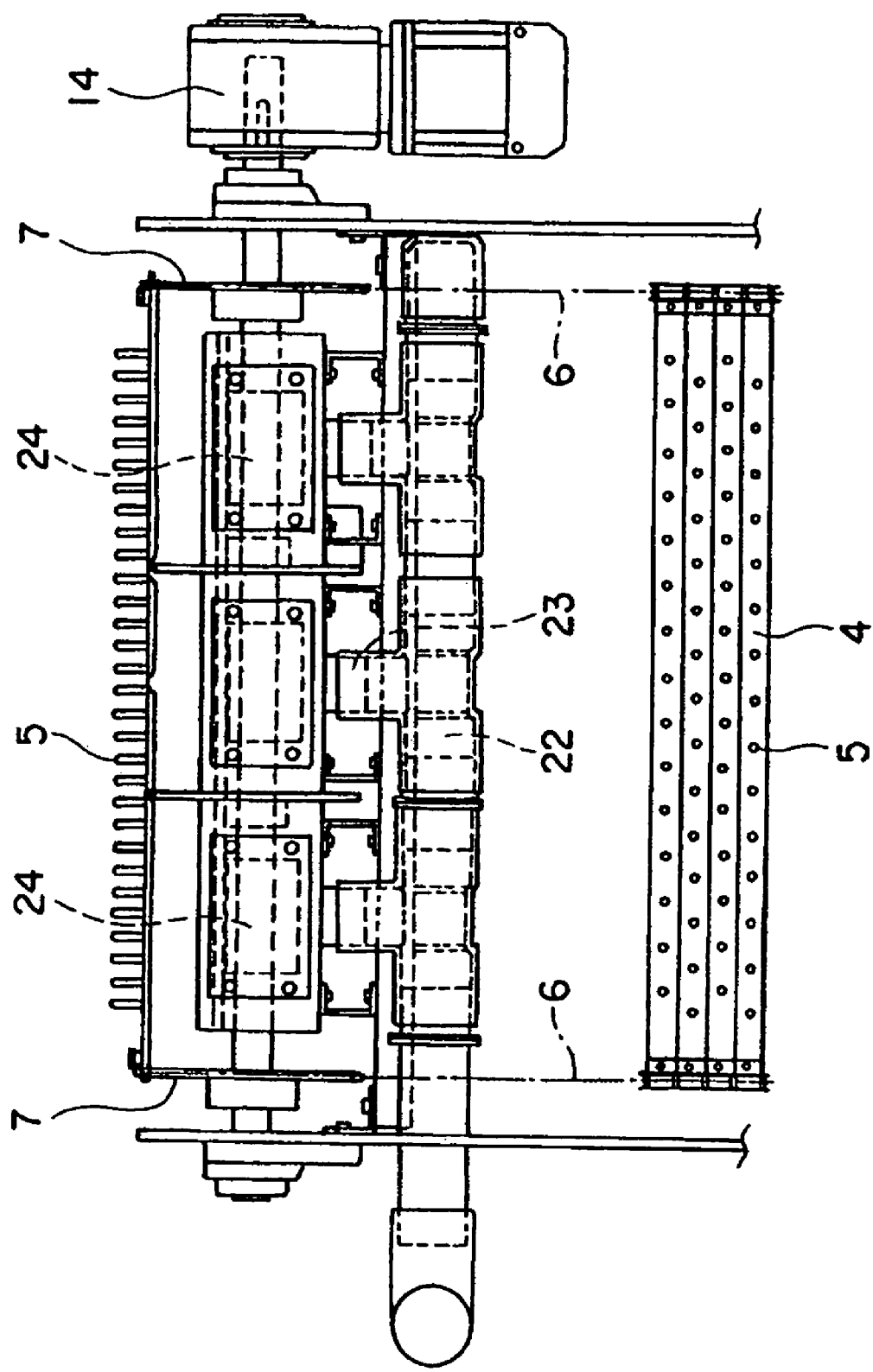
FIG. 5 is a cross sectional plan view showing a structure of the delivery end portion of the transfer conveyor of FIG. 2.

Herebelow, the present invention will be more concretely described based on an embodiment, as illustrated, of a bean sprouts-like articles transfer conveyor device according to the present invention. In this embodiment, the present invention is applied to a transfer conveyor device in a bean sprouts metering apparatus in which bean sprouts as harvested and washed by water are transferred into a metering hopper to be metered by a predetermined quantity to be packaged. In FIG. 1 showing an entire construction of the device, a transfer conveyor device 1 comprises a transfer conveyor 3 that is risingly supported by a frame 2. The transfer conveyor 3 comprises a plurality of laterally elongating conveyor plates 4 that are arranged orthogonally to a transfer direction of the conveyor, as shown in FIG. 5. Each of the conveyor plates 4 is provided with a plurality of needle members 5 that perpendicularly rise up from a surface of the conveyor plate 4 and is also provided with pores of appropriate diameters to thereby be permeably constructed. The conveyor plates 4 have their respective both ends connected to chains 6 that are wound around upper and lower sprockets 7 so that the endless transfer conveyor 3 is formed. In FIG. 1, the sprocket 7 on the upper side only is shown. The transfer conveyor 3 is constructed to be led by guide rollers 8 and guide members 9, 10 to form a transfer path rising from a water tank (not shown) for washing bean sprouts contained therein arranged at a lower right side position in FIG. 1 to a delivery end 15 arranged at an upper left side position. The transfer conveyor 3 is operated to run in a direction shown by arrow 11 and by being turned around the sprockets 7 at both end portions of the transfer path, it runs endlessly.

In operation of the transfer conveyor 3, the bean sprouts washed in the water tank on the lower right side are picked up being caught on the needle members 5 and placed on the transfer conveyor 3 and are then in a dispersed state scraped up in the direction of the arrow 11 toward the delivery end 15 on the upper left side. Below a position where the bean sprouts transferred by the transfer conveyor 3 are caused to fall down from the delivery end 15, a metering hopper (not shown) is arranged. The metering hopper functions to receive the bean sprouts scraped up by the transfer conveyor 3 to fall down from the delivery end 15 and also functions to meter the bean sprouts by a predetermined weight to be sent to a packaging device (not shown). In FIG. 1, numeral 12 designates a smoothing device, such as a brush, functioning to smooth the bean sprouts transferred on the transfer conveyor 3 being scraped up by the transfer conveyor 3. Also, in a return running path downstream of the turning end portion on the upper left side as the delivery end 15, a scraper member 13 provided with grooves through which the needle members 5 pass is arranged being opposed to the transfer conveyor 3 for scraping out sticking matters from the transfer conveyor 3. It is preferable that the scraper member 13 is constructed to be able to be supported at two positions, one position where the scraper member 13 abuts on the transfer conveyor 3 and the other position that is apart from the transfer conveyor 3 for the purpose of cleaning or the like.

Numeral 20 designates a blower constructed to be driven by an inverter-controlled motor so that flow rate of compressed air to be supplied from the blower 20 is controllable. The compressed air from the blower 20 is led to an inner side of the delivery end 15 forming the turning end portion on the upper left side of the transfer conveyor 3 via a duct 21 and, at the delivery end 15, is ejected from the inner side of the transfer conveyor 3 to the outer side where the needle members 5 are provided. Concrete construction thereof will be described with reference to FIGS. 2 to 5.

On the inner side of the transfer conveyor 3 at the delivery end 15, a manifold piping 22 is arranged elongating horizontally in a width-wise direction of the transfer conveyor 3. The duct 21 is arranged to communicate with one end of the manifold piping 22 so that the compressed air from the blower 20 is led into the manifold piping 22 from the duct 21.

Figure 3:
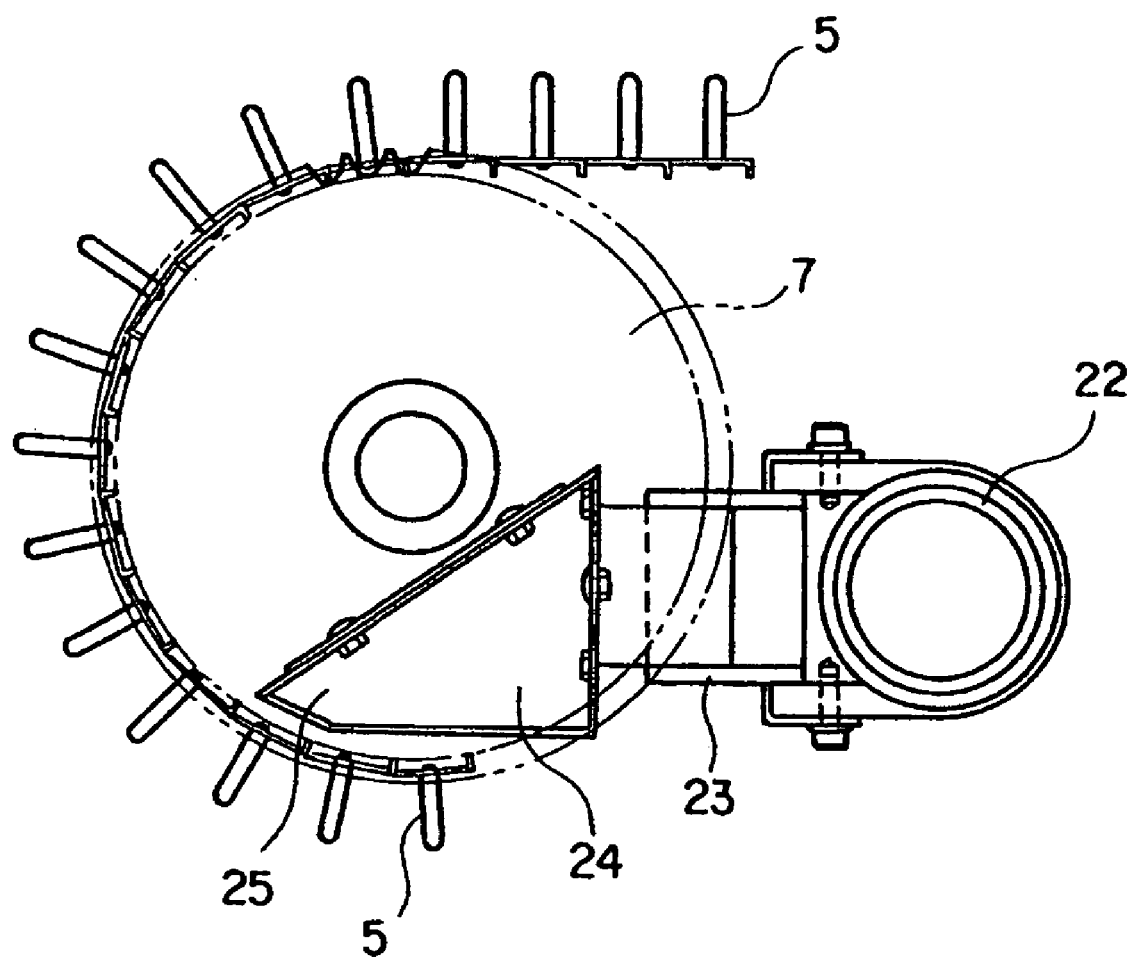
FIG. 3 is an enlarged cross sectional view showing an inner structure of the portion of a delivery end of the transfer conveyor of FIG. 2.
Figure 4:
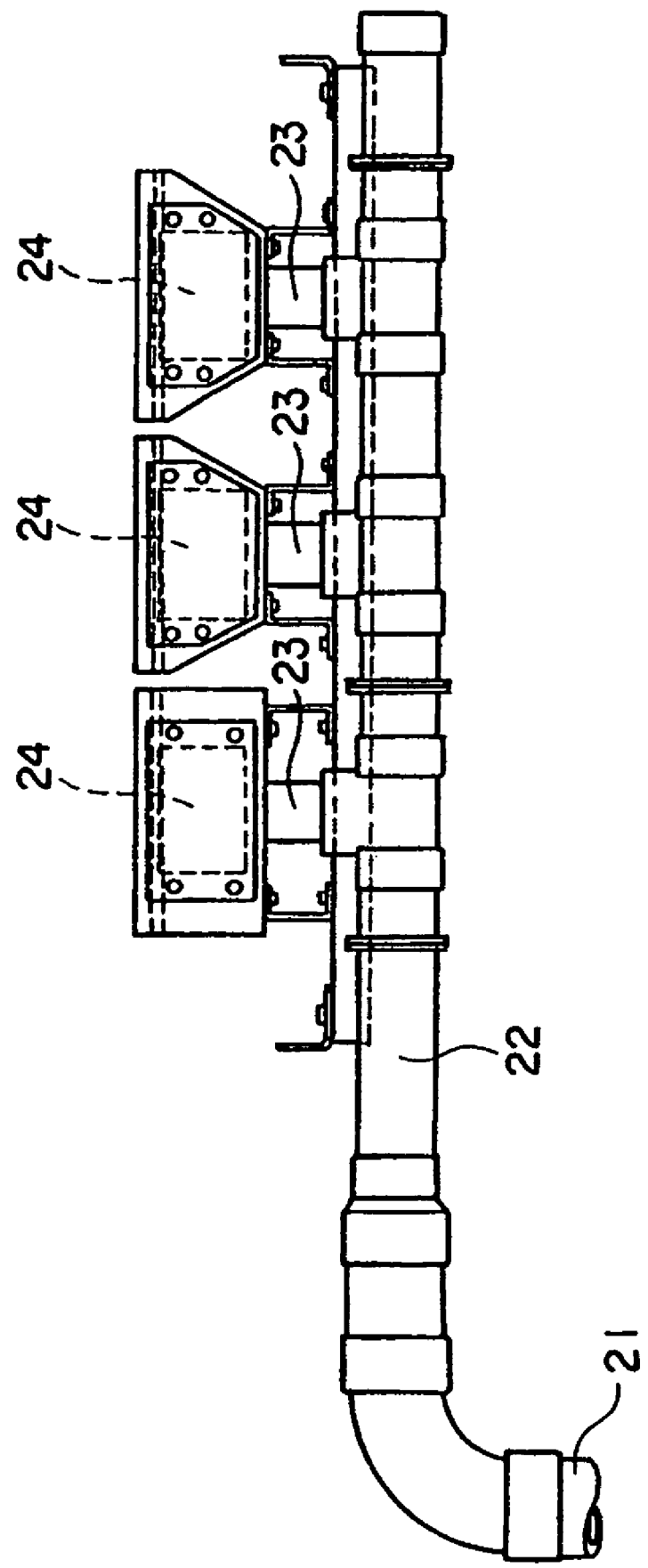
FIG. 4 is a plan view showing a compressed air supply system of the bean sprouts transfer conveyor device of FIG. 1.

Three air boxes 24 are provided to communicate with the manifold piping 22 via respective connecting pipes 23 so that the compressed air from the manifold piping 22 is supplied into the three air boxes 24. A vertical cross section of each of the air boxes 24 is triangular, as seen in FIG. 3, and a terminal end lower side thereof forms an air ejecting port 25 that opens downwardly. The air ejecting port 25 elongates in a slit-like shape along the width-wise direction of the transfer conveyor 3. The air ejecting ports 25 of the three air boxes 24 form the entire air ejecting ports 25 that elongate along the entire width of the transfer conveyor 3. At the turning end portion forming the delivery end 15 of the transfer conveyor 3 and between the two sprockets 7 (FIG. 5), the air ejected from the air ejecting ports 25 is blown outside of the transfer conveyor 3 through the pores of the transfer conveyor 3. By this air so ejected, the bean sprouts entangled or caught on the needle members 5 are separated from the needle members 5 and fall down to be delivered. In FIG. 5, numeral 14 designates a motor that rotationally drives the sprockets 7 for running of the chains 6.

With respect to the transfer conveyor device 1 constructed as illustrated and described above, the function will be described next. In FIG. 1, the bean sprouts are scraped up being caught on the needle members 5 of the transfer conveyor 3 from the washing water tank (not shown) arranged on the lower right side and transferred upward in the direction of the arrow 11 to the delivery end 15 on the upper left side. On the way of the transfer by the transfer conveyor 3, the bean sprouts on the transfer conveyor 3 are uniformly smoothed by the smoothing device 12. The bean sprouts lifted up to the delivery end 15 fall down from the transfer conveyor 3 that turns at the delivery end 15 so that they are supplied into a metering hopper below (not shown). As for the bean sprouts entangled or caught on the needle members 5 so that they do not fall down from the transfer conveyor 3, when they come to the position where the air ejecting ports 25 of the air boxes 24 are arranged on the inner side of the transfer conveyor 3, they receive the ejected air that is ejected toward outside of the transfer conveyor 3 from the air ejecting ports 25 through the pores of the transfer conveyor 3 so that they are separated from the transfer conveyor 3 and fall down.

If flow velocity or flow rate of the ejected air is large, unnecessary matters sticking to the transfer conveyor 3, such as bean shells, broken roots, dust, etc., also will be removed from the transfer conveyor 3 to fall down. Reversely, if the flow velocity or flow rate of the ejected air is small, even the bean sprouts appropriate as commercial goods will be hardly removed from the transfer conveyor 3. Hence, by using the inverter-controlled motor controlling the rotation for driving the blower 20, flow velocity or flow rate of the ejected air is controlled to be set appropriately.

The transfer conveyor 3 is turned at the delivery end 15 to enter the return running path. The scraper 13 is arranged in the return running path and the surface of the transfer conveyor 3 and the needle members 5 are wiped by the scraper 13 so that broken short bean sprouts, roots, dust, etc. sticking to or caught on the needle members 5 or transfer conveyor 3 are removed. It is to be noted that not necessarily the scraper 13 but appropriate removing means of the unnecessary matters other than the scraper, such as a washing means by water, can be employed.

By operating the device as described above, the bean, sprouts can be uniformly supplied into the metering hopper arranged below the transfer conveyor 3 to be accurately metered by a predetermined quantity. The bean sprouts so metered by the predetermined quantity are sent to packaging facilities (not shown) to be packaged there.

Metering of the bean sprouts supplied into the metering hopper can be carried out as disclosed in the Japanese laid-open patent application No. 1988-47224. That is, if a load cell of the metering hopper detects that a predetermined first weight has been reached, the transfer velocity is lowered. At the same time, a shutter arranged on the way of falling down to the metering hopper is partially closed so that opening of the shutter arranged on a bean sprouts falling supply path between the delivery end 15 of the transfer conveyor 3 and the metering hopper is narrowed and thus the bean sprouts by a small quantity fall down to be supplied into the metering hopper from the transfer conveyor 3. If the load cell of the metering hopper detects that a predetermined second weight to be finally metered has been reached, the shutter is closed, the bean sprouts falling supply path between the delivery end 15 of the transfer conveyor 3 and the metering hopper is closed and a discharge port of the metering hopper is opened. Thus, the bean sprouts metered by the predetermined weight in the metering hopper are sent to the packaging step.

In the foregoing, while the present invention has been concretely described based on the embodiment as illustrated, it is a matter of course that the present invention is not limited to the construction shown by this embodiment but may be added with various modifications.

For example, in the embodiment, while air is ejected from the surface of the delivery end of the transfer conveyor, according to the kinds of bean sprouts-like articles or if the bean sprouts-like articles to be delivered may be wetted, not air but other fluid, such as water, is ejected from a nozzle, etc. and thereby a device that can more easily attain the initial object can be obtained. Also, if a sterilizing agent, such as ozone, is added to the fluid to be ejected, various minor germs sticking to the bean sprouts-like articles delivered from the transfer conveyor can be reduced and thereby the quality of the bean sprouts-like articles can be maintained for a longer time.

Also, as the transfer conveyer device of the above-mentioned embodiment, while such a structure is employed that the transfer conveyor 3 comprises the two chains 6, each of the chains 6 being wound around the two sprockets 7, and the plurality of conveyor plates 4 fitted to the chains 6, each of the conveyor plates 4 being fitted with the plurality of needle members 5 and having the permeability, not necessarily this structure but devices of various other structures may be employed, if such a transfer conveyor can be constructed as is provided with the needle members and as has a fluid-passability so that fluid is ejected at the delivery end. Also, in the device as illustrated, in order to eject the compressed air at the delivery end 15 of the transfer conveyor 3, while such a structure is employed that the compressed air is led to the three air boxes 24 from the manifold 22 and is ejected from the air ejecting ports 25 of the air boxes 24, not necessarily this structure but various other air ejecting structures may be employed.

Also, in the above-mentioned embodiment, while such a structure is employed that the blower 20 is driven by the inverter-controlled motor so that the flow velocity or flow rate of the ejected air can be adjusted to be appropriately set, not necessarily this structure but such a structure that the air duct 21, etc. are provided with a throttle valve may be employed. Also, in the above-mentioned embodiment, while the scraper member 13 provided with the grooves through which the needle members pass is arranged being opposed to the transfer conveyor at the position downstream of the delivery end for scraping out the sticking matters from the transfer conveyor, not limitedly to this scraper member but other appropriate means, such as a washing nozzle by water, etc., may be employed, if the matters sticking to the transfer conveyor can be removed from the transfer conveyor. Also, in the embodiment as illustrated, while the present invention is applied to the transfer conveyor by which bean sprouts are scraped up and supplied into the metering hopper, the bean sprouts-like articles transfer conveyor device according to the present invention may be widely applied to various apparatus and devices as transfer conveyor devices for transferring not only the bean sprouts but also the bean sprouts-like articles.

What is claimed is:

1. A bean sprouts-like articles transfer conveyor device comprising a transfer conveyor having a fluid-passability, said transfer conveyor being constructed to turn at its both end portions so as to run endlessly and having its outer side surface provided with a plurality of needle members, and a fluid supply means, said fluid supply means being constructed to lead fluid to an inner side of said transfer conveyor at a position of a delivery end of said transfer conveyor so that the fluid led from said fluid supply means is ejected from the surface of said transfer conveyor provided with said needle members through said transfer conveyor having the fluid-passability.

2. A bean sprouts-like articles transfer conveyor device as claimed in claim 1, wherein said transfer conveyor is constructed comprising two chains wound around two sprockets arranged at the respective end portions of said transfer conveyor and a plurality of conveyor plates having the fluid-passability, said conveyor plates being arranged in parallel with each other, having their both end portions fitted to said chains and being respectively provided with said needle members.

3. A bean sprouts-like articles transfer conveyor device as claimed in claim 1, wherein a scraper member provided with grooves through which said needle members pass is arranged being opposed to said transfer conveyor at a position downstream of said delivery end for scraping out sticking matters from said transfer conveyor.

4. A bean sprouts-like articles transfer conveyor device of a bean sprouts-like articles metering supply apparatus, said metering supply apparatus comprising a metering hopper into which bean sprouts-like articles are to be supplied, wherein the bean sprouts-like articles transfer conveyor device as mentioned in claim 1 is arranged having one of its turning end portions as said delivery end confronted with said metering hopper so that the bean sprouts-like articles are supplied into said metering hopper.

5. A bean sprouts-like articles transfer conveyor device as claimed in claim 2, wherein a scraper member provided with grooves through which said needle members pass is arranged being opposed to said transfer conveyor at a position downstream of said delivery end for scraping out sticking matters from said transfer conveyor.

6. A bean sprouts-like articles transfer conveyor device of a bean sprouts-like articles metering supply apparatus, said metering supply apparatus comprising a metering hopper into which bean sprouts-like articles are to be supplied, wherein the bean sprouts-like articles transfer conveyor device as mentioned in claim 2 is arranged having one of its turning end portions as said delivery end confronted with said metering hopper so that the bean sprouts-like articles are supplied into said metering hopper.

* * * * *